Patented Oct. 10, 1933

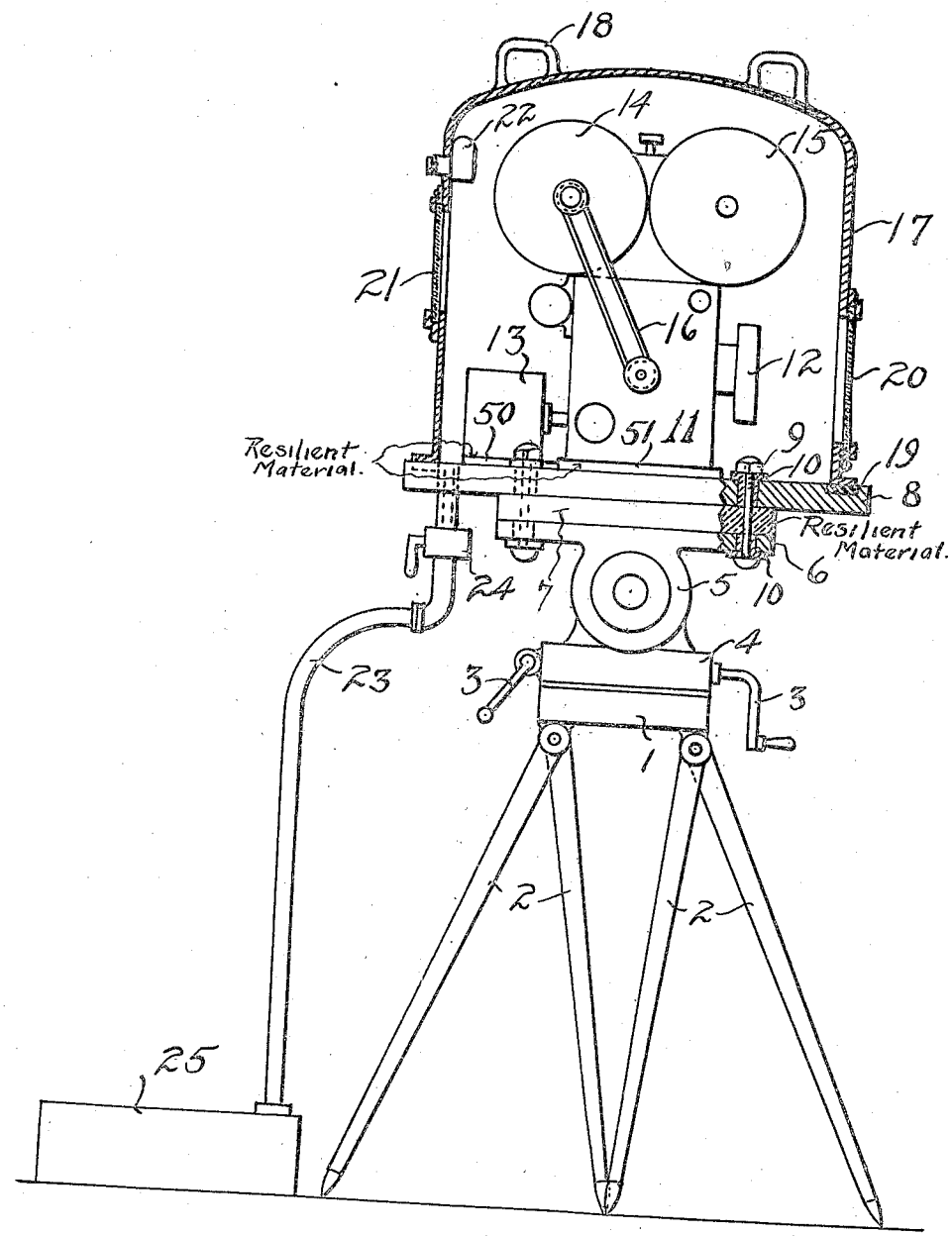

1,929,626

UNITED STATES PATENT OFFICE 1,929,626

SOUNDPROOFING PICTURE RECORDING CAMERA

Lee de Forest, New York, N. Y., assignor to De Forest Phonofilm Corporation, New York, N. Y., a corporation of Delaware Application September 22, 1928
Serial No. 307,616

9 Claims. (Cl. 88—16.2)

This invention relates in general to cameras for photographically recording pictures constructed so as to prevent the recording on the sound film of the undesired noises incident to the operation of the camera itself.

One of the objects of this invention is the location of a picture recording camera within an evacuated chamber in order to prevent the audible generation of sounds that would be picked up by the microphones and recorded on the sound film.

A further object of this invention is the provision of apparatus of this nature which is relatively simple in construction and which is adapted to permit of the correct operation and manipulation of the camera without impairing its functions.

These and other objects, as will appear from the following disclosure, are secured by means of this invention.

This invention resides substantially in the combination, construction, arrangement, and relative location of parts, all as will appear more fully hereinafter.

The single figure is a side elevational view with some parts in cross section of the device of this invention.

It has long been known in the art of recording sound and motion simultaneously where it is necessary to have a microphone located somewhere near the picture recording camera that the noise from the mechanism of the camera is frequently recorded with the sound which it is desired to record. Efforts have been made in the past to prevent the noise of the camera from reaching the microphone by placing the camera in a sound proof booth, as shown in my United States Patent No. 1,653,155, issued December 20, 1927. Such means have been fairly satisfactory when used in connection with the ordinary motion picture camera equipped with high speed mechanism which is quieter than the ordinary step by step camera mechanism.

However, in color photography, when it is desired to make a sound record at the same time, it has been found that the camera employed for taking colored motion pictures is necessarily very much noisier in its operation than is the ordinary camera for black and white film recording. The mechanical complications which cause this noise seem to be inherent to most, if not all, apparatus employed in the processing of color photography and I have found that to effectively eliminate or subdue the noise from the color picture camera by placing the same in a sound proof booth no matter how constructed is in- effective and unsatisfactory. This is true even if the window in the side of the booth through which the camera receives its light is covered by one or more sheets of optical glass. One sheet of optical glass is in itself quite ineffective and two sheets of optical glass separated by an air space for sound deadening purposes while being fairly satisfactory in eliminating sounds from the booth very materially reduce the amount of light reaching the camera; whereas for color photography work it is very essential that the maximum amount of light reach the camera.

To obviate this difficulty and permit the use of a microphone close to the camera which is recording colored pictures I have devised an arrangement which I find is exceedingly effective rendering even the very noisest type of colored picture camera practically silent so far as any undesired sound effects it may have on the microphone.

Referring to the drawing, the supporting tripod for the camera is shown comprising the lens pod 2 and platform 1 on which is mounted the rotatable platform 4 and the operating handles 3 for controlling the position of the camera, as is well known in this art. Pivotally mounted on the bracket member 4 is a bracket 5 having the plate portion 6 to which the rest of the mechanism is secured. Superimposed upon the plate member 6 is a sheet of resilient material 7 which may be of felt, celotex, or other suitable vibration absorbing material. Supported on the sheet of resilient material 7 is a table or platform member 8 provided with a groove in its upper surface in which is an inset of rubber or gasket of other suitable material 19. The members 6, 7 and 8 are firmly secured together by means of nuts and bolts 9 which are separated from the members 6 and 8 by means of suitable washers or bushings of felt and the like. By means of this structure any vibrations set up on the upper paltform are not transmitted to the supporting mechanism and undesired sounds are thus prevented at this point. Mounted on the platform 8 is the picture recording camera 11 which, of course, may be of any suitable form and construction and in itself forms no part of this invention. The camera aperture is shown at 12 and an electric motor 13 is provided for driving the camera. The film magazines are shown at 14 and 15 and are driven from the camera proper by means of the belt 16. It may again be pointed out that all of this structure is merely given to indicate generally a camera and the method of driving it in order to secure the benefits of this invention.

At 17 is a container or chamber which is, for instance, bell-shaped and open at the bottom. The size and configuration of the base of the container is the same as that of the gasket 19 so that it may be placed down over the camera and operating mechanism and rests upon the gasket 19. This container may be made, for example, of aluminum and is provided with an opening over which the glass window 20 is placed. This window is secured to the container 17 in any suitable manner to provide an airtight joint and is arranged in alignment with the light aperture 12 of the camera. A similar window is shown at 21 at the rear of the mechanism and permits of the camera again observing what is taking place within the apparatus. A suitable electric light and shade 22 controllable from the outside of the container is provided for lighting up the interior thereof when this is desired. The platform 8 is provided with an opening therethrough in which is secured a pipe having a valve 24 therein. This pipe is connected by means of a flexible hose or tube 23 to a manifold 25 which may extend to different points within the studio. The pipe in the best form should be made of large size and the manifold 25 is connected to a vacuum pump of capacity sufficiently great so that the interior of the chamber 17 may be quickly exhausted without undue delay.

In the best practice the motor 13 is of the synchronous type so that the sound recording camera or phonographic wax cutting mechanism (not shown) may be actuated by a similar synchronous motor. The two motors are connected to the same source of current so that the picture and sound recording mechanisms would be driven in perfect synchronism.

In the operation of this device the camera is threaded up in the usual manner and adjusted for correct operation. The bell jar or container 17 is then inverted over the camera and brought to rest on the gasket 19. Valve 24 is then placed in position so that the interior of the container is in communication with the manifold 25 and the vacuum pump, which may be running all of the time if desirable, then quickly removes substantially all of the air from the container 17. The camera can then be set in operation by energizing the motor 13 through a control switch exterior of the container. Since substantially all of the air has been removed from the container any vibrations set up by the camera are not transmitted to the exterior of the container because of the lack of any material substance through which the vibrations may be transmitted. As is of course apparent if found desirable the camera and motor may also be mounted upon plates of vibration absorbing material, such as felt, as indicated for instance at 50 and 51. When the recording operation is completed valve 24 is moved to a position to admit atmospheric pressure within the container 17 which may then be removed. The valve 24 has not been disclosed in detail since it is in fact an ordinary two-way valve of which there are many examples now known.

It will be seen then that I take advantage of a vacuum which will permit practically no sound in securing the object of this invention. No sounds will be heard exterior of the container 17 when the degree of vacuum is correct. The table or platform 8 may be preferably of bakelite rather than metal and, being insulated from the supporting tripod, does not permit of the transmission of any sound in harmful quantities.

I have found that a bell jar device of this type is very effective in silencing camera noises and that its placement over the camera and removal become very simple operations and interfere very little with the ordinary operation of the camera.

I am, of course, well aware that many changes in the details of construction and relative arrangement of parts will readily occur to those skilled in this art and I do not, therefore, desire to be strictly limited to the form of apparatus given by me for purposes of illustration but rather to the principles and scope of the invention as they have been defined in the appended claims.

What I seek to secure by United States Letters Patent is:—

1. In an apparatus of the type described, the combination with a motion picture camera, a support therefor, and a gasket on said support of an open ended container adapted to be inverted over said camera and rest in air-tight fashion on said gasket, means for exhausting the interior of the container, transparent window portions aligned with the light aperture of said camera and forming a part of said container, and means for illuminating the interior of the container whereby the operation of the camera may be observed.

2. In an apparatus of the type described, the combination with a support and a motion picture camera thereon, of an open ended container inverted over said camera and resting on said support in air-tight fashion, a transparent window in the wall of said container in alignment with the light aperture of said camera, and means for exhausting the interior of said container.

3. In an apparatus of the type described, the combination with a motion picture camera, an electric motor for operating said camera and a support for said camera and motor, of an open ended container inverted over said camera and motor and resting on said support in air-tight fashion, a transparent window in the wall of said container in alignment with the light aperture of said camera, and means for exhausting the interior of said container.

4. In an apparatus of the type described, the combination of a support, a platform on said support, means between said platform and support for preventing the transmission of vibrations from said platform to said support, a motion picture camera supported on said platform, an open ended container supported over said camera and resting on said platform in air-tight fashion, and a transparent window in the wall of said container in alignment with the light aperture of said camera, and means for exhausting the interior of said container.

5. In an apparatus of the type described, the combination comprising a closed container, a support therefor, a transparent window in the wall thereof, a motion picture camera within said container having its light aperture in alignment with the transparent window, a conduit leading to the interior of said container and having a two-way valve therein, said container and its support forming an air-tight construction to permit exhaustion of the interior of the container through said conduit when the valve is in one position and supplied with air at atmospheric pressure when in its other position.

6. In a device of the type described, an air-tight receptacle having a transparent window therein, a photographic recording device having a lens mechanism in alignment with said window, means for withdrawing the air from within the receptacle, and means for operating said photographic recording device from a point external to the receptacle.

7. In an apparatus of the type described, the combination comprising a support, a photographic recording camera mounted on said support, and a container having a transparent window portion therein in alignment with the light aperture of said camera, said container enclosing said camera in air-tight fashion and adapted to be exhausted of air.

8. In an apparatus of the type described, the combination with a motion picture camera, a support therefor and a gasket on said support of an open ended container having a transparent window portion therein in alignment with the light aperture of said camera, adapted to be inverted over said camera and rest on said gasket in air-tight fashion, and means for exhausting the interior of the container.

9. In an apparatus of the type described, the combination comprising a sound insulated support, a motion picture camera on said support, means for operating said camera connected thereto, an air and light-tight cover over said camera having a transparent window portion therein in alignment with the light aperture of said camera, and means connected with the space formed by the cover and support for exhausting the air therefrom.

LEE DE FOREST.